United States Patent [19]
Lindblad

[11] 3,905,614
[45] Sept. 16, 1975

[54] SAFETY BELT FOR VEHICLES
[76] Inventor: Oskar Lennart Lindblad, Box 11, 440 20 Vargarda, Sweden
[22] Filed: Dec. 29, 1972
[21] Appl. No.: 319,632

[52] U.S. Cl. ............................................. 280/150 SB
[51] Int. Cl.² ................................................ B60R 21/10
[58] Field of Search ........ 280/150 SB; 297/388, 389

[56] References Cited
UNITED STATES PATENTS
3,351,382  11/1967  Davies ........................... 280/150 SB
3,680,883  8/1972  Keppel ........................... 280/150 SB

*Primary Examiner*—Robert R. Song
*Assistant Examiner*—R. Schrecengost
*Attorney, Agent, or Firm*—Ulle C. Linton

[57] ABSTRACT

A safety belt for vehicles attached by a take-up device inside a vehicle seat and extending in two parts to runners on a side wall of the vehicle, which runners are carried along diverging guide rails by driven conveyor means in said guide rails. The belt thus provides a shoulder belt and a lap belt for a person on said seat in one position of said belt parts.

8 Claims, 5 Drawing Figures

SAFETY BELT FOR VEHICLES

The present invention relates to a safety belt for vehicles and of so called three point type, the safety belt comprising two band parts, which from a fastening point in the middle of the vehicle diverge towards the wall side of the vehicle, at which one of the in between them separated ends of said diverging band parts in functioning condition of the safety belt reaches contact with said side wall at a point located in the upper portion of said sidewall, the other end reaching contact at a point located in the lower portion of said sidewall, so that the lower band part will lie over the hips of a person fastened by means of the safety belt, and the other band part will extend diagonally over the chest of said person, characterized by comprising means for displacement of both the contact points in the longitudinal direction of the vehicle between a front position, in which said band parts are positioned at a distance from said person and in front of him, and a rear position, in which the safety belt is in said functioning condition.

It is a principal object of the invention to provide a safety belt of the kind mentioned above, the fastening and unfastening of which can be carried (entirely) or in part without any active intervention from the person, who shall be fastened by the safety belt.

Figure 1:
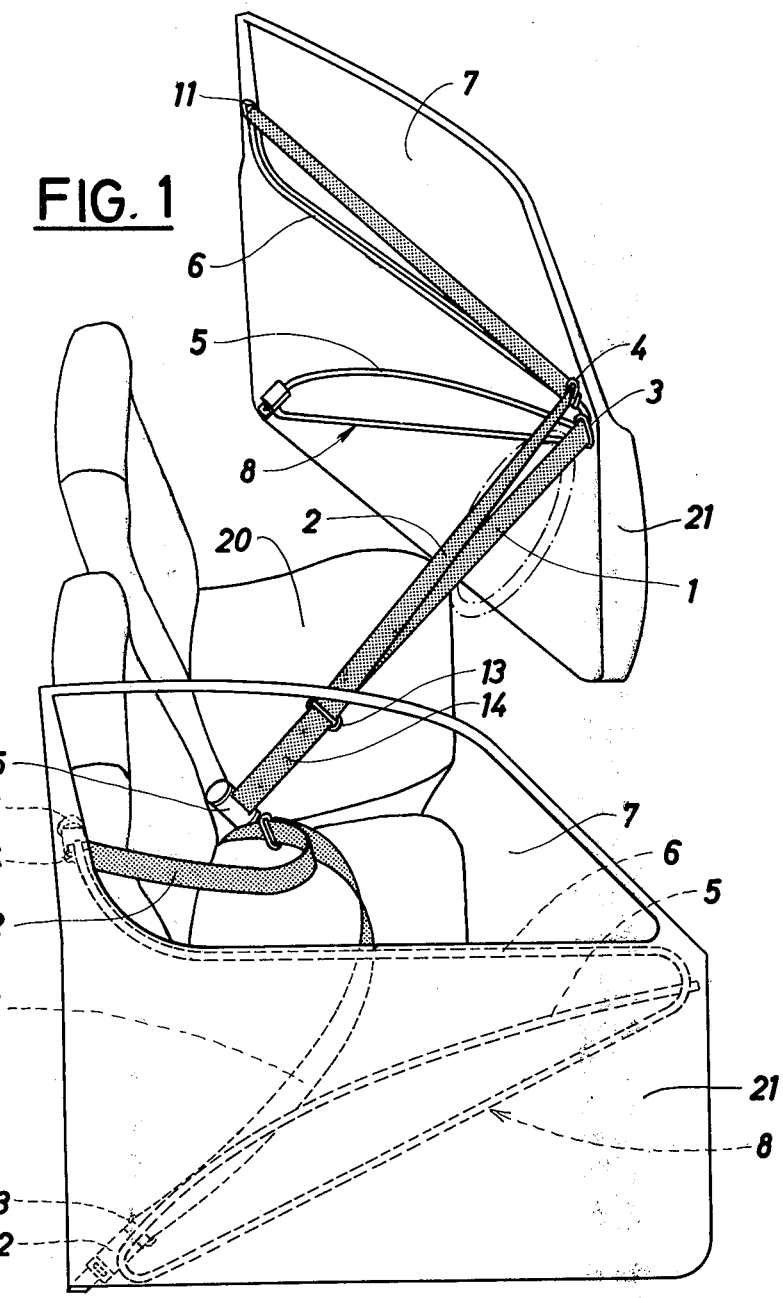
Figure 2:
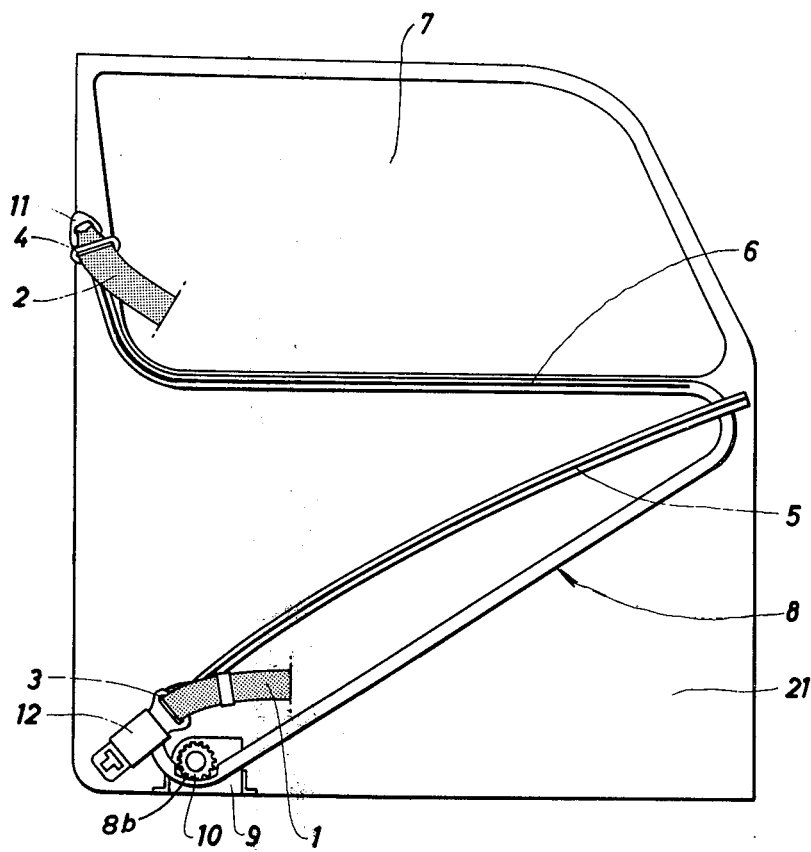
Figure 3:
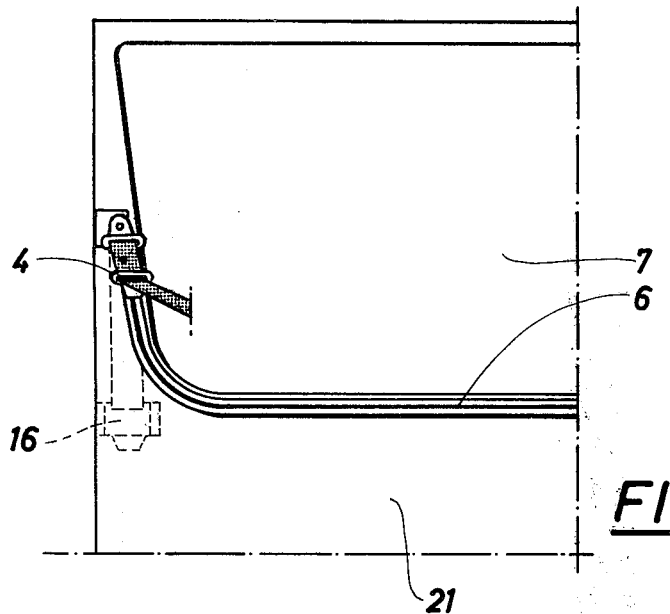
Figure 4:
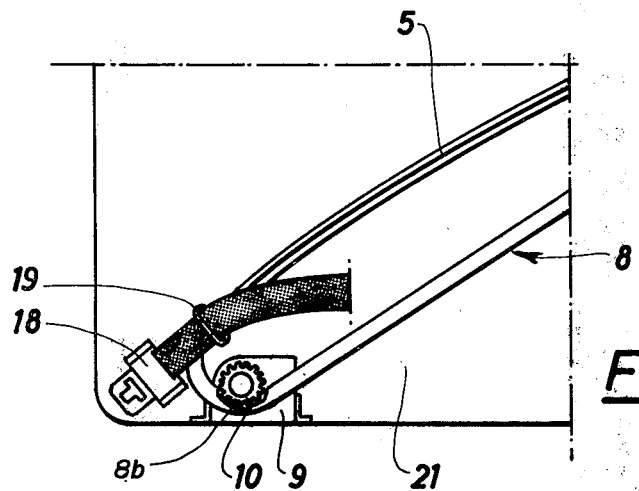
Figure 5:
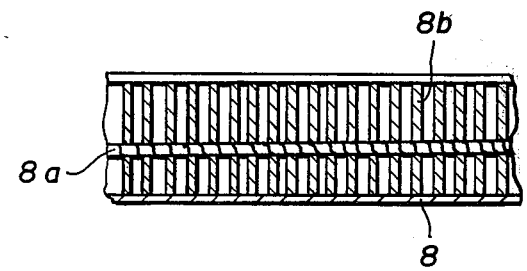

In the following a few variations of embodiments of a safety belt made in accordance with the invention will be described with reference to the accompanying drawings, in which:

FIG. 1 schematically illustrates the front seats of a vehicle, in which two safety belts made in accordance with the invention are mounted, one safety belt being shown in nonfunctioning condition and the other one shown in functioning condition FIG. 2 illustrates on an enlarged scale the part of the safety belt, which is mounted at one of the doors of the vehicle, the safety belt in this figure being in its functioning condition, FIG. 3 illustrates a part of said safety belt according to a somewhat different embodiment, FIG. 4 shows another part of the safety belt according to still another embodiment, and FIG. 5 is a longitudinal section of a portion of a cable forming a part of the present device.

In FIG. 1 the front seats of the vehicle are indicates with 20, and its front side doors are indicated with 21. The safety belt comprises two band parts 1 and 2 respectively, which from a point located at the middle of the vehicle diverge in direction towards the door 21 of the vehicle, i.e. each one towards its contact point on the same, which can be displaced in the longitudinal direction of the vehicle counted between a front position, which is shown at the left seat in FIG. 1, and a rear position, which is shown at the right seat of the same figure, the safety belt being in nonfunctioning condition in the first position and in functioning condition in the last mentioned position. At said contact points each one of the band parts 1 and 2 is supported by means of a runner 3 and 4 respectively, which both are displaceable along guides 5 and 6 respectively arranged on the inside of the door. The guides illustrated converge in direction from the rear edge of the door towards its front edge and at their front ends are positioned near to the low edge of the window 7 of the door. The guides 5 and 6 comprise parts of a tube 8, which is bent in loop shape, which tube in its inwards turning side is slit in the portions shaping the guides. Inside the tube there is a flexible pulling device in displaceable mounting, which by way of example can comprise a central wire 8a exhibiting a number of interspaced ringshaped flanges 8b as shown in FIG. 5. The pulling device in this way takes the shape of a flexible rack with flanges 8b meshing with a gear 10, preferably driven by an electric motor 9. As is evident from the drawings, the loop is laid in such a way that the end portions of the tube 8, i.e. the portions shaping said guides, are directed opposite each other counted in the longitudinal direction of the vehicle. The runners 3 and 4 are attached to the pulling device each one near to its end of the same. When the gear 10 in FIG. 2 is rotating clockwise, thus both runners will be displaced towards the front portions of the guides, i.e. the position, which these ones occupy, when the safety belt is nonfunctioning. The movement of the runners towards their functioning positions is of course obtained by rotation of the gear 10 in opposite direction. The upper band part 2 is thread through a loop of the runner 4, in which it can slide, and its end is attached to the rear part of the door by means of a fitting 11. The end of the lower band part 1 fixed to the runner 3 in such a way that it cannot slide. A coupling part, mounted at the lower portion of the door, is indicated with 12, it being possible to lock the runner 3 to said part in functioning condition of the safety belt. The band parts 1 and 2 enter into a common band, which is thread through a loop 13 in such a way that it can slide in the same. The loop 13 is attached to one end of another band 14, which subjected by the bias of a spring can be wound up on a roller of a winding up device 15, which by way of example can be of such a type that it is locked at rapid changes of speed of the vehicle in one direction or the other, possibly also at a rapid unwinding of the band 14 from the roller of the winding up device 15. Possibly the upper band part 2 in a corresponding manner can be wound up on a winding up device 16 mounted on the door, as is shown in FIG. 3. It is also possible to provide the coupling part, mounted on the lower portion of the door, with a winding up device 18, as is shown in FIG. 4. In this case the lower runner is provided with a loop 19, through which the band part 3 is thread in such a way that it can slide. The safety belt according to the invention can exhibit only one of the winding up devices mentioned or several of them in combination without departing from the fundamental idea of the invention. If the safety belt is provided with a winding up device mounted in the upper or in the lower part of the door and a central winding up device positioned in the middle of the vehicle, the winding up devices can be made with electromagnetic or mechanical locking, possibly with an additional locking of by way of example the roller mounted on the door, which roller is actuated by rapid changes of the speed of the vehicle. These winding up devices can by way of example be arranged in such a manner that one winding up device is blocked when the other one is unblocked, while the winding up device mounted on the door is blocked, when the runners are in their front position, and the door of the vehicle is open, as is the case in the driver's seat in FIG. 1, and that during the shutting movement of the door the central winding up device 15 stretches the band part 14 at the same time as the upper and lower band parts 2 and 1 respectively are transported from their rest positions at the front edge of the door to their rear positions, in which the safety belt is in functioning condition, and the winding up device mounted on the door is blocked during said transportation. In addition the winding up devices can be guided in such a way that the winding up device mounted on the door is liberated, when the runners 3 and 4 have reached their rear positions, and a simultaneous locking takes place in the central winding up device 15. Further there can be arrangements in order to automatically block the winding up device mounted on the door at the same time as a blocking takes place in the centrically mounted winding up device, when the door is opened and the runners move towards their rest positions at the front edge of the door.

The invention is not limited to the embodiment illustrated in the drawings and described by way of example only, but can be variated as to its details within the scope of the following claims.

What I claim is:

1. A safety belt arrangement for a seat-occupant in a vehicle and of so called three point type, comprising in combination first and second belt parts diverging in a direction from an attachment inside the seat towards the wall side of the vehicle, at which the outer end of said first belt part in active condition of said safety belt contacts the side wall at an upper point on door panel, and the outer end of said second belt part contacts said door panel at a lower point on said wall, wherein said first belt part constitutes a shoulder belt and said second belt part constitutes a lap part, means for moving said upper and lower contact points in the longitudinally direction of the vehicle between a front position, in which said belt parts are positioned at a distance from said person and in front of him and a rear position, in which the safety belt is in said active condition, and further comprising a pair of runners, a guide rail for guiding said runners constituting one of said first and second contact points for said first and second belt parts, a flexible conveyor device having said runners connected thereto at distance from each other, said conveyor being guided by and movable along said guide rail, said guide rail having portions converging from the rear to the front of said wall and an intermediate portion and said runners being placed at a distance from each other along said guide rail and said conveyor device, whereby one of said runners is conveyed in the same direction as the other runner in the longitudinal direction of the vehicle, when said conveyor device is being displaced along said guide rail.

2. A safety belt arrangement as claimed in claim 1, wherein said guide rail is constituted by a tube, which houses said flexible conveyor device therein, said runners being fastened to said conveyor device by means of fastening means extending through openings in said tube having the same extension in the longitudinal direction of the tube as the travelling paths of said runners.

3. A safety belt arrangement as claimed in claim 1, wherein said conveyor device has interspaced ring shaped flanges forming a rack, and motor driven gear meshes said rack for the longitudinal movement of said conveyor device.

4. A safety belt arrangement as claimed in claim 1, wherein said guide rail in the forward direction of the vehicle converge towards a comparatively high up point of said wall side of the vehicle.

5. A safety belt arrangement as claimed in claim 1, wherein said guide rail is mounted inside the front side door of the vehicle.

6. A safety belt arrangement as claimed in claim 1, wherein at least one of said belt parts is fastened to the rear edge of the door and slideably threaded through a portion of its runner.

7. A safety belt arrangement, as claimed in claim 6, including a locking retractor, and said belt part, which is fastened to the rear portion of the door under the bias of a spring is windeable up on said locking retractor fixedly mounted on the door.

8. A safety belt arrangement as claimed in claim 1, including an eye and said diverging belt portions comprise a common band, which inside the seat is slideably thread through said eye, a second band fastened to said eye and a locking retractor device having said second band windeable under a spring thereon.

* * * * *